(12) United States Patent
Leng et al.

(10) Patent No.: US 11,163,714 B2
(45) Date of Patent: Nov. 2, 2021

(54) METHOD, APPARATUS, ELECTRONIC DEVICE AND COMPUTER READABLE STORAGE MEDIUM FOR SUPPORTING COMMUNICATION AMONG CHIPS

(71) Applicant: Beijing Baidu Netcom Science And Technology Co., LTD., Beijing (CN)

(72) Inventors: Xianglun Leng, Beijing (CN); Hefei Zhu, Beijing (CN); Qingshu Chen, Beijing (CN); Zhibiao Zhao, Beijing (CN); Xiaozhang Gong, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 35 days.

(21) Appl. No.: 16/711,196

(22) Filed: Dec. 11, 2019

(65) Prior Publication Data
US 2020/0409895 A1 Dec. 31, 2020

(30) Foreign Application Priority Data

Jun. 25, 2019 (CN) .......................... 20191055466.1

(51) Int. Cl.
*G06F 13/40* (2006.01)
*G06F 11/20* (2006.01)
(Continued)

(52) U.S. Cl.
CPC ...... *G06F 13/4027* (2013.01); *G06F 11/2007* (2013.01); *G06F 13/38* (2013.01);
(Continued)

(58) Field of Classification Search
CPC .. G06F 13/4027; G06F 11/2007; G06F 13/38; G06F 13/4221; H04L 29/12207
See application file for complete search history.

(56) References Cited

U.S. PATENT DOCUMENTS

| 6,687,862 B1 * | 2/2004 | Martinez ................ G11C 29/44 714/723 |
| 8,145,880 B1 | 3/2012 | Cismas et al. |

(Continued)

FOREIGN PATENT DOCUMENTS

| CN | 109376116 A | 2/2019 |
| JP | H06231095 A | 8/1994 |
| JP | 2020-098470 A | 6/2020 |

OTHER PUBLICATIONS

Japanese Office Action dated Aug. 6, 2021 issued in JP Application No. 2020-002569.

*Primary Examiner* — Henry Tsai
*Assistant Examiner* — Christopher A Daley
(74) *Attorney, Agent, or Firm* — Weaver Austin Villeneuve & Sampson LLP

(57) ABSTRACT

Embodiments of the present disclosure relate to a method, an apparatus, an electronic device and a computer readable storage medium for determining connection relationships among a plurality of chips. The method includes determining identity information of a plurality of chips managed by a host, the plurality of chips being connected by respective inter-chip communication interfaces for inter-chip communication. The method further includes allowing one or more of the plurality of chips to acquire identity information of other chips connected to the inter-chip communication interface of the one or more chips. The method further includes reading identity information of the other chips by means of a management interface of the one or more chips with regard to communicating with the host, so as to determine connection relationships among the plurality of chips.

15 Claims, 4 Drawing Sheets

(51) Int. Cl.
*G06F 13/38* (2006.01)
*H04L 29/12* (2006.01)
*G06F 13/42* (2006.01)
*G06N 5/04* (2006.01)

(52) U.S. Cl.
CPC .... *G06F 13/4221* (2013.01); *H04L 29/12207* (2013.01); *G06F 2201/805* (2013.01); *G06N 5/04* (2013.01)

(56) References Cited

U.S. PATENT DOCUMENTS

| | | |
|---|---|---|
| 9,432,298 B1 | 8/2016 | Smith |
| 2002/0152060 A1 | 10/2002 | Tseng |
| 2008/0112311 A1 | 5/2008 | Hariharan et al. |
| 2010/0019794 A1* | 1/2010 | Amon ............ G01R 31/318505 324/750.3 |
| 2012/0275296 A1 | 11/2012 | Song |
| 2015/0324319 A1* | 11/2015 | Leidel .................. G06F 3/0607 711/148 |
| 2017/0039152 A1 | 2/2017 | Zheng |
| 2018/0019976 A1* | 1/2018 | Ben-Shalom ......... H04L 12/185 |
| 2019/0303268 A1* | 10/2019 | Ansari ................ G06F 11/2236 |

* cited by examiner

METHOD, APPARATUS, ELECTRONIC DEVICE AND COMPUTER READABLE STORAGE MEDIUM FOR SUPPORTING COMMUNICATION AMONG CHIPS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure primarily relate to the field of computers and specifically to a method, an apparatus, an electronic device and a computer readable storage medium for supporting communication among a plurality of chips.

BACKGROUND

With the development of computer technologies, the artificial intelligence applications have an increasing requirement for computing power. However, due to limitations in process and power consumption, the computing power of a single chip (such as an artificial intelligence chip or a GPU) is no longer sufficient for the requirement of the processing speed. Therefore, a plurality of chips needs to be connected to each other so as to form a chip network, thus meeting the needs of the artificial intelligence applications. Hence, it is necessary to optimize inter-chip communication so as to achieve a high bandwidth and a low latency.

In addition, different operators and algorithms for the artificial intelligence applications have different requirements for the bandwidth and the latency. Different network topologies have different bandwidths and latency. How to support different network topologies, especially dynamic topology changes, is another challenge for the inter-chip communication.

SUMMARY

According to example embodiments of the present disclosure, a scheme for supporting communication among a plurality of chips is provided.

In a first aspect of the present disclosure, a method for supporting communication among a plurality of chips is provided. The method includes determining identity information of a plurality of chips managed by a host, the plurality of chips being connected through respective communication interfaces for inter-chip communication; allowing one or more of the plurality of chips to acquire identity information of other chips connected to the inter-chip communication interface of the one or more chips; and acquiring the identity information of the other chips through a management interface of the one or more chips with regard to communicating with the host, so as to determine connection relationships among the plurality of chips.

In a second aspect of the present disclosure, an apparatus for supporting communication among a plurality of chips is provided. The apparatus includes an identity information determination module, configured for determining identity information of a plurality of chips managed by a host, the plurality of chips being connected through respective inter-chip communication interfaces for inter-chip communication; a chip instruction module, configured for allowing one or more of the plurality of chips to acquire identity information of other chips connected to the inter-chip communication interface of the one or more chips; and a connection relationship determination module, configured for acquiring the identity information of the other chips by means of a management interface of the one or more chips with regard to communicating with the host, so as to determine connection relationships among the plurality of chips.

In a third aspect of the present disclosure, an electronic device is provided, including one or more processors; and a storage apparatus for storing one or more programs, when executed by the one or more processors, cause the one or more processors to implement the method according to the first aspect of the disclosure.

In a fourth aspect of the present disclosure, a computer readable storage medium is provided, storing a computer program thereon, where the program, when executed by a processor, implements the method according to the first aspect of the disclosure.

It should be understood that the content described in the summary section of the disclosure is not intended to limit the key or important features of the embodiments of the present disclosure, nor is it intended to limit the scope of the present disclosure. Other features of the present disclosure will become easily understood by the following description.

BRIEF DESCRIPTION OF THE DRAWINGS

With reference to the following accompanying drawings and detailed descriptions, other features, advantages and aspects of some embodiments of the present disclosure will become more apparent. In these accompanying drawings, the same or similar marks indicate the same or similar elements.

DETAILED DESCRIPTION OF EMBODIMENTS

The embodiments of the present disclosure will be described more fully hereinafter with reference to the accompanying drawings. Although some embodiments of the present disclosure are shown in the accompanying drawings, it should be understood that the present disclosure may be embodied in various forms and should not be construed as limited to the embodiments set forth herein. On the contrary, these embodiments are provided to make the present disclosure thorough and complete. The accompanying drawings and embodiments of the present disclosure are to be considered as illustrative only but not limiting the scope of protection of the present disclosure.

In the description of some embodiments of the present disclosure, the term "include" and the like should be understood as open terms, i.e., "including but not limited to". The term "based on" should be understood as "at least partially based on." The term "an embodiment" or "the embodiment" should be understood as "at least one embodiment." The terms "first," "second" and the like may refer to different or identical objects. Other explicit and implicit definitions may also be included below.

As mentioned above, there is a need for a method for supporting communication among a plurality of chips so as to acquire a connection relationship of a chip network quickly and efficiently at a low cost, thereby supporting dynamic changes in a topology of the chip network, and then changing the topology according to requirements so as to increase the bandwidth and reduce the latency. Since an inter-chip communication technology in a traditional chip network is mainly used to solve a fixed topology of a chip network, the topology of the chip network is not flexible, and the network often suffers from a problem of insufficient bandwidth.

According to an embodiment of the present disclosure, a solution for supporting communication among a plurality of chips is provided. In the present solution, a host such as a central processing unit (CPU) may enumerate and number a plurality of chips such as artificial intelligence chips managed thereby; and then, the CPU instructs the chips to perform connection sensing operations respectively. As an example, the chip may read status information of ports thereof, configure a predetermined address range when the status information is an active status, transmit test data to a specific address within the address range, and wait for returned response data. After receiving the response data, the chip acquires from the response data the number of other chips communicating with the port. The CPU aggregates connection information collected by the chips, so as to obtain physical connection information of any chip network. After obtaining the physical connection information of the chip network, logical connection relationships among the chips may be dynamically configured according to a service requirement, thereby constructing a required topology.

Figure 1A:
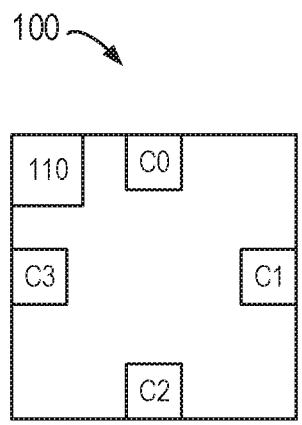
FIG. 1A is a schematic diagram of an interface configuration of an example chip according to a plurality of embodiments of the present disclosure.

In order to describe the topology of the chip network according to a plurality of embodiments of the present disclosure and a construction process thereof in more detail, the chip network is briefly described first. FIG. 1A is a schematic diagram of an interface configuration of an example chip 100 according to a plurality of embodiments of the present disclosure. As shown in FIG. 1A, the chip 100 includes a plurality of interfaces, such as a management interface 110 and inter-chip communication interfaces C0, C1, C2 and C3. The management interface 110 is used for communicating with a host such as a CPU that manages the chip 100, and is generally used for receiving configuration information from the host and transmitting connection information of the chip 100. As an example, the management interface 110 may be a PCIe interface. In addition, the inter-chip communication interfaces C0, C1, C2 and C3 are used for inter-chip communication with other chips managed by the host. As an example, the inter-chip communication interfaces C0, C1, C2 and C3 may be CCIX interfaces.

Figure 1B:
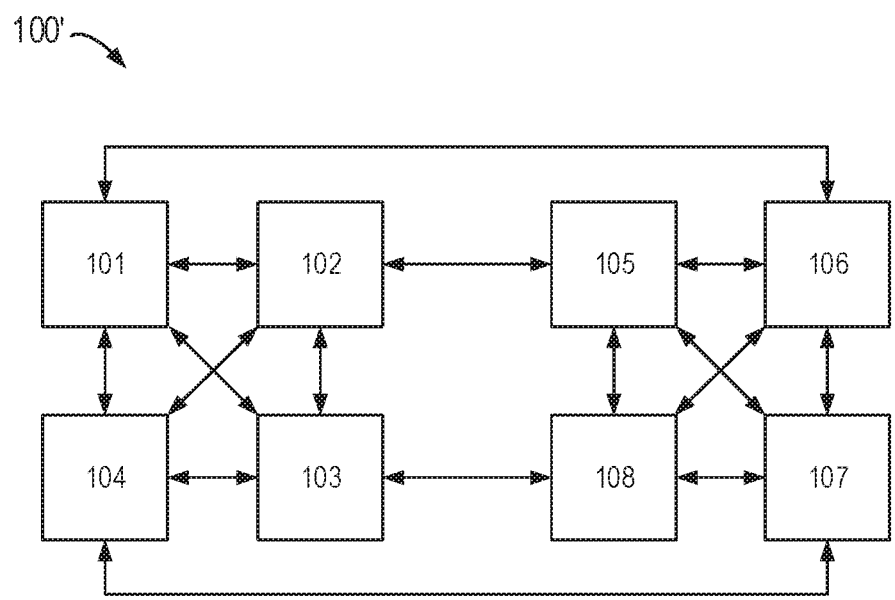
FIG. 1B is a schematic diagram of an example chip network in which a plurality of embodiments of the present disclosure may be implemented.

The so-called chip network refers to a network formed by directly physically connecting inter-chip communication interfaces of a plurality of chips. FIG. 1B is a schematic diagram of an example chip network 100' in which a plurality of embodiments of the present disclosure may be implemented. As shown in FIG. 1B, each block represents a chip. Each chip has unique chip identity information in a chip network 100'. For example, reference marks 101, 102, 103, 104, 105, 106, 107 and 108 of chips may be used to represent the identity information of the chips. It should be understood that specific examples of the identity information are illustrative and are not intended to be limiting, and that the identity information of the chips is not limited to being represented by a number.

Any chip in the chip network 100' may be directly physically connected to one or more other chips. It should be noted that the chip network 100' may be composed of a plurality of chips integrated on one circuit board, or may be constituted by connecting, through a data transmission line, a plurality of chips in a device controlled by the chips. Therefore, pins (such as the inter-chip communication interfaces C0, C1, C2 and C3 in FIG. 1) of the two chips integrated on one circuit board are directly connected, or interfaces (such as the inter-chip communication interfaces C0, C1, C2 and C3 in FIG. 1) of chips in two devices are connected via a data transmission line. That is to say, the connection between two chips may be understood as a mutual connection between the two chips through corresponding interfaces. For example, the chip 101 transmits information to the chip 102. Specifically, the chip 101 transmits information to the chip 102 through its own interface C1 that is connected to the chip 102.

Further, it should be understood that in order to focus on the details of the inter-chip communication technology, FIG. 1B of the present disclosure does not show the communication process between the management interface 110 of the chips and the host such as a CPU. As an example, the chips 101, 102, 103 and 104 may communicate with a PCIe switch module (not shown) by means of a management interface 110 such as a PCIe interface, for the PCIe switch module to communicate with the host. Similarly, the chips 105, 106, 107 and 108 may also communicate with another PCIe switch module (not shown) by means of a management interface 110 such as a PCIe interface, for the another PCIe switch module to communicate with the host. Alternatively or additionally, the chips 101, 102, 103, 104, 105, 106, 107 and 108 may also communicate directly with the host by respective management interfaces 110.

The chip 100 and chip network 100' in the technical solution are for illustrative purposes only but are not intended to be limiting of the present disclosure. It should be understood that the configuration of the chip, especially the configuration of the chip interface, may be various, so a topology interface of the chip network may be more complicated. Accordingly, various modifications may be made to the chip 100 and the chip network 100' without departing from the scope of protection of the present disclosure. In order to more clearly explain the principles of the solution, a process of determining connection relationships among a plurality of chips will be described in more detail below with reference to FIG. 2.

Figure 2:
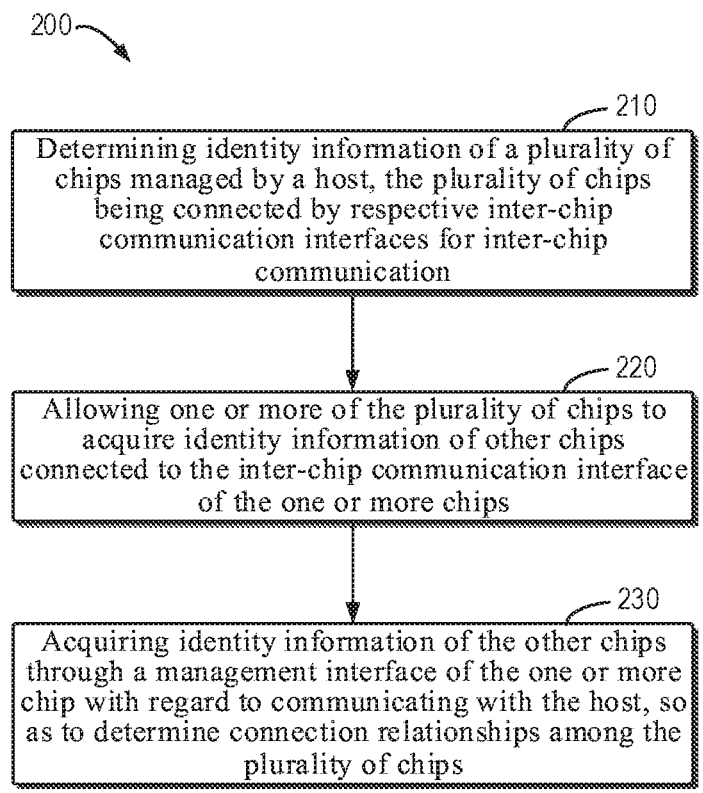
FIG. 2 is a flowchart of a process for supporting communication among a plurality of chips according to an embodiment of the present disclosure.

FIG. 2 shows a flowchart of a process 200 for supporting communication among a plurality of chips according to an embodiment of the present disclosure. For ease of discussion, the process 200 will be described in conjunction with FIG. 1A and FIG. 1B.

In 210, identity information of a plurality of chips managed by a host may be determined, the plurality of chips being connected by respective inter-chip communication interfaces for inter-chip communication. As an example, the host may enumerate all chips managed thereby to determine identity information of such chips, for example, the chips 101, 102, 103, 104, 105, 106, 107 and 108 in Figure IB. These chips may be connected by respective groups of inter-chip communication interfaces C0, C1, C2 and C3, thus forming a chip network 100'.

In 220, a perception instruction may be issued to the chips such that one or more of these chips acquires identity information of other connected chips to the inter-chip communication interface of the one or more of these chips. As an example, the host may transmit an instruction to all chips managed thereby, so that all chips perform an operation of acquiring identity information of other chips connected thereto. Alternatively or additionally, the host may transmit the perception instruction only to an active chip managed thereby. Due to the particularity of the chip network such as an artificial intelligence chip, the connection relationships among the chips are usually extremely complicated. Starting from the inter-chip communication interface of the chips, the detailed connection relationships of the chip network may be obtained by transmitting a test signal and receiving a response signal. Since the perception operation is initiated from the inter-chip communication interface of the chips, it is not needed to detect the specific interface of the chip connected to the inter-chip communication interface (because the interface also performs the same perception operation).

Figure 3:
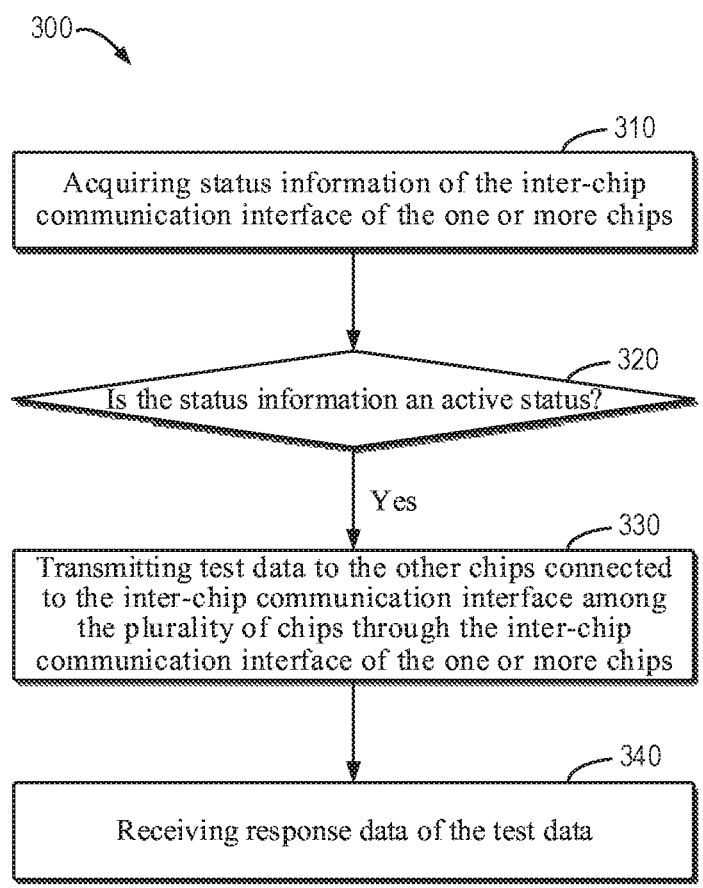
FIG. 3 is a flowchart of a process for acquiring identity information of other connected chips according to an embodiment of the present disclosure.

In some embodiments, a more complete and automated information transfer process may be used to obtain the identity information of other connected chips. FIG. 3 shows a flowchart of a process 300 for obtaining identity information of other connected chips according to an embodiment of the present disclosure.

In 310, one or more chips acquire status information of the inter-chip communication interface of the one or more chips. As an example, a micro control unit MCU in each chip may read the status of the inter-chip communication interfaces C0, C1, C2 and C3.

In 320, whether the status information is an active status may be determined. It should be noted that if the inter-chip communication interface is active, the inter-chip communication interface is physically connected to the inter-chip communication interfaces of other chips; and if the inter-chip communication interface is inactive, the inter-chip communication is not physically connected to the chip communication interfaces of the other chips. If the inter-chip communication interface is inactive, such interface is not operated. If the inter-chip communication interface is active, 330 is proceeded.

In 330, test data is transmitted to other chips connected to the inter-chip communication interface. In some embodiments, a predetermined address range (e.g., a BAR0 address) may be configured for the inter-chip communication interface first, and then test data is transmitted to addresses of the other chips within the predetermined address range. As an example, a Hello data-packet may be transmitted to the addresses, i.e., a write storage instruction is transmitted first and written data are specific data, for example, 0xa1a1, and then a read storage instruction is transmitted to the addresses.

In 340, since the read storage instruction is transmitted to the specific address, in this case, the chip waits for a reply, and then receives response data of the test data. As an example, the response data is generally ACK packets, and the response data include the identity information of other connected chips.

After the process 300 that a chip acquires the identity information of other chips connected thereto is described in detail, it is returned to FIG. 2 and the process 200 for determining connection relationships among the plurality of chips will be discussed again. The process 200 proceeds to 230 after each chip is instructed to acquire the identity information of other chips connected thereto.

In 230, the identity information of the other chips may be acquired through a management interface 110 of the one or more chips with regard to communicating with the host, so as to determine connection relationships among a plurality of chips. As an example, after the chips complete a connection perception operation, interruption information may be transmitted to the host so as to inform the host that the operation is completed. Thereafter, the host may read the connection information acquired by each chip through the management interface 110, such as a PCIe interface, of each chip. And then, the host may determine physical connection relationships among the chips managed thereby. In this way, the host such as a CPU may determine the physical connection relationships among the chips managed thereby.

In some embodiments, the host may store the determined connection relationships among the chips in a connection matrix. For example, the chip 101, as shown in FIG. 1B, may determine by a connection perception operation that the inter-chip communication interface C0 thereof is connected to the chip 106, the inter-chip communication interface C1 thereof is connected to the chip 102, the inter-chip communication interface C2 thereof is connected to the chip 104, and the inter-chip communication interface C3 thereof is connected to the chip 103. Similarly, the chip 102 may determine by a connection perception operation that the inter-chip communication interface C0 thereof is connected to the chip 104, the inter-chip communication interface C1 thereof is connected to the chip 105, the inter-chip communication interface C2 thereof is connected to the chip 103, and the inter-chip communication interface C3 thereof is connected to Chip 101. The chip 103 may determine by a connection perception operation that the inter-chip communication interface C0 thereof is connected to the chip 102, the inter-chip communication interface C1 thereof is connected to the chip 108, the inter-chip communication interface C2 thereof is connected to the chip 101, and the inter-chip communication interface C3 thereof is connected to Chip 104. In a similar fashion, a connection matrix as shown in Table 1 may be constructed.

TABLE 1

| Chip ID | Interface | | | |
| --- | --- | --- | --- | --- |
|  | C0 | C1 | C2 | C3 |
| 101 | 106 | 102 | 104 | 103 |
| 102 | 104 | 105 | 103 | 101 |
| 103 | 102 | 108 | 101 | 104 |
| 104 | 101 | 103 | 107 | 102 |
| 105 | 107 | 106 | 108 | 102 |
| 106 | 101 | 108 | 107 | 105 |
| 107 | 106 | 105 | 104 | 108 |
| 108 | 105 | 107 | 106 | 103 |

In Table 1, the topmost line is the identifiers of four inter-chip communication interfaces of each chip, the leftmost column is the identity information (ID) of each chip, and other data is the identity information of corresponding chips that are connected to corresponding interfaces of each chip. By constructing the connection matrix as shown in Table 1, the host may easily know the physical connection relationships among chips. Alternatively or additionally, the connection matrix further includes at least one of status information and bandwidth information of respective inter-chip communication interfaces of the chips. By determining and maintaining the connection matrix containing various information, the host such as a CPU may more fully grasp the connections among the chips managed thereby, thus facilitating the subsequent dynamic configuration of a topology of the chip network.

In some embodiments, the connection fault may also be detected by the inter-chip communication interface of the one or more chips. As an example, when the detected connection fault is repairable, the connection fault is repaired and a result of the repair is reported. When the detected connection fault is irreparable, a service transmitted by the inter-chip communication interface of the one or more chips is switched to another inter-chip communication interface, and the connection fault is reported. In this way, even if a connection fault occurs among the chips, the chip network may continue to work by repairing or directly transferring the service, and convenience may be provided for the host to update the connection matrix maintained thereby by reporting to the host.

In some embodiments, the connection relationships among the plurality of chips may also be enumerated according to a determined number of chips, and the chips are configured according to a user-specified connection relationship in the enumerated connection relationships. As an example, all logical connections that may be implemented may be enumerated according to the physical connection relationships among the chips that are recorded in the connection matrix. For example, according to the physical connection relationships in Table 1, at least two logical connection modes of the chips may be enumerated: 101<->104<->103<->102<->105<->108<->107<->106<->101; and 101<->102<->104<->107<->105<->106<->108<->103<->101. Then, a logical connection mode may be selected to perform a specific computing service.

In the embodiments of the present disclosure, the host may be a central processing unit (CPU), and the chip may be a system on chip (SoC).

Compared with the traditional technology, the solution according to the present disclosure determines, according to an inter-chip communication interface of each chip, a chip connected to this chip, so as to create and maintain a physical connection matrix of the chip network on a CPU side, thereby facilitating the detection of a connection fault of the chip network and dynamic configuration of the topology of the chip network. In addition, since the logical connection topology of the chips may be flexibly configured, the number of chips in the topology structure and the connection modes thereof may be changed according to requirements, thereby increasing the bandwidth of the chip network and reducing the delay.

An example of the connection relationship among chips in some example scenarios is discussed. However, it should be understood that the descriptions of the such scenarios are merely illustrative of some embodiments of the present disclosure in the form of examples. Depending on the actual needs, different strategies may be selected in different or similar scenarios. It should be also noted that the technical solutions according to the present disclosure are not limited to the field of artificial intelligence chips in nature, and the technical solution of the present disclosure may also have the above-mentioned advantages when such solution is applied to other fields in which multiple chips are required to cooperatively process mass services.

Figure 4:
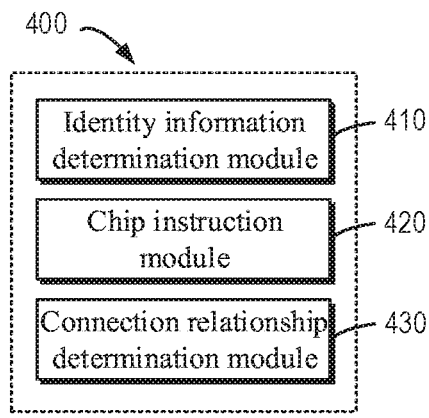
FIG. 4 is a schematic block diagram of an apparatus for supporting communication among a plurality of chips according to an embodiment of the present disclosure.

FIG. 4 shows a schematic block diagram of an apparatus 400 for supporting communication among a plurality of chips according to an embodiment of the present disclosure. As shown in FIG. 4, the apparatus 400 includes: an identity information determination module 410, configured for determining identity information of a plurality of chips managed by a host, the plurality of chips being connected by respective inter-chip communication interfaces for inter-chip communication; a chip instruction module 420, configured for allowing one or more of the plurality of chips to acquire identity information of other chips connected to the inter-chip communication interface of the one or more chips; and a connection relationship determination module 430, configured for acquiring identity information of the other chips through a management interface 110 of the one or more chips with regard to communicating with the host, so as to determine connection relationships among the plurality of chips.

In some embodiments, the chip instruction module 420 may further include: a status information reading module, configured for acquiring status information of the inter-chip communication interface of the one or more chips; a test data transmitting module, configured for transmitting, in response to the status information being an active status, test data to the other chips, connected to the inter-chip communication interface, among the plurality of chips through the inter-chip communication interface of the one or more chips; and a response data receiving module, configured for receiving response data of the test data, the response data including the identity information of the other chips.

In some embodiments, the test data transmitting module may further include: an address range configuration module, configured for configuring a predetermined address range for the inter-chip communication interface of the one or more chips; and a transmitting submodule, configured for transmitting test data to the address of the other chips within the predetermined address range.

In some embodiments, the apparatus 400 may further include: a connection relationship storage module, configured for storing the determined connection relationships among the plurality of chips in a connection matrix, where the connection matrix includes at least one of followings: status information of the respective inter-chip communication interfaces of the plurality of chips, and bandwidth information.

In some embodiments, the apparatus 400 may further include: a first fault detection module, configured for detecting a connection fault by the inter-chip communication interface of the one or more chips; a repairing module, configured for repairing the connection fault in response to the detected connection fault being repairable; and a repair result reporting module, configured for reporting a result of the repair.

In some embodiments, the apparatus 400 may further include: a second fault detection module, configured for detecting a connection fault by the inter-chip communication interface of the one or more chips; a service switching module, configured for transferring, in response to the detected connection fault being irreparable, a service transmitted by the inter-chip communication interface of the one or more chips to an additional inter-chip communication interface; and a connection fault reporting module, configured for reporting the connection fault.

In some embodiments, the apparatus 400 may further include: a connection relationship enumerating module, configured for enumerating the connection relationships among the plurality of chips according to a determined number of the plurality of chips; and a chip configuration module, configured for configuring the plurality of chips according to a user-specified connection relationship among the enumerated connection relationships.

In some embodiments, the host may be a central processing unit (CPU), and the plurality of chips may be systems on chip (SoCs).

Figure 5:
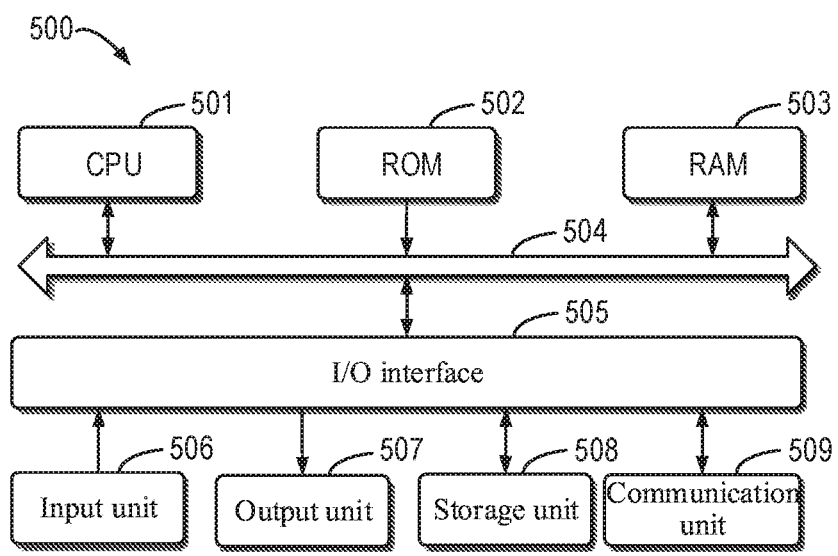
FIG. 5 is a block diagram of a computing device capable of implementing a plurality of embodiments of the present disclosure.

FIG. 5 shows a schematic block diagram of an example apparatus 500 that may be used to implement some embodiments of the present disclosure. As shown, the apparatus 500 includes a central processing unit (CPU) 501 that may execute various appropriate actions and processes according to a computer program instruction stored in a read only memory (ROM) 502 or a computer program instruction loaded into a random access memory (RAM) 503 from a storage unit 508. Various programs and data required for the operation by the apparatus device 500 may also be stored in the RAM 503. The CPU 501, the ROM 502 and the RAM 503 are connected to each other through a bus 504. An input/output (I/O) interface 505 is also coupled to bus 504.

A plurality of components in the apparatus 500 are connected to an I/O interface 505, the components including: an input unit 506, such as a keyboard and a mouse; an output unit 507, such as various types of displays and speakers; a storage unit 508, such as a magnetic disk and an optical disk; and a communication unit 509, such as a network card, a modem and a wireless communication transceiver. The communication unit 509 allows the apparatus 500 to exchange information/data with other apparatuses over a computer network such as the Internet and/or various telecommunication networks.

The processing unit 501 executes the various methods and processes described above, such as the process 200 or 300. For example, in some embodiments, the process 200 or 300 may be implemented as a computer software program that is tangibly embodied in a machine readable medium, for example, the storage unit 508. In some embodiments, some or all of the computer programs may be loaded and/or installed onto the apparatus 500 via the ROM 502 and/or the communication unit 509. When a computer program is loaded into the RAM 503 and executed by the CPU 501, one or more steps of the process 300 may be executed. Alternatively, in other embodiments, the CPU 501 may be configured to execute the process 200 or 300 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for supporting communication among a plurality of chips, comprising:
   determining identity information of a plurality of chips managed by a host, the plurality of chips being connected through respective communication interfaces for inter-chip communication;
   allowing one or more of the plurality of chips to acquire identity information of other chips connected to the inter-chip communication interface of the one or more chips;
   acquiring the identity information of the other chips through a management interface of the one or more chips with regard to communicating with the host, so as to determine connection relationships among the plurality of chips;
   detecting a connection fault by the inter-chip communication interface of the one or more chips;
   switching, in response to the detected connection fault being irreparable, a service transmitted by the inter-chip communication interface of the one or more chips to an additional inter-chip communication interface; and
   reporting the connection fault.

2. The method according to claim 1, wherein the allowing one or more of the plurality of chips to acquire identity information of other chips comprises:
   acquiring status information of the inter-chip communication interface of the one or more chips;

transmitting, in response to the status information being an active status, test data to the other chips connected to the inter-chip communication interface among the plurality of chips through the inter-chip communication interface of the one or more chips; and receiving response data of the test data, the response data comprising the identity information of the other chips.

3. The method according to claim 2, wherein the transmitting the test data to the other chips comprises:

configuring a predetermined address range for the inter-chip communication interface of the one or more chips; and transmitting test data to an address of the other chips within the predetermined address range.

4. The method according to claim 1, further comprising:
storing the determined connection relationships among the plurality of chips in a connection matrix, wherein the connection matrix comprises at least one of followings:

status information of the respective inter-chip communication interfaces of the plurality of chips, and bandwidth information.

5. The method according to claim 1, further comprising:
repairing the connection fault in response to the detected connection fault being repairable; and
reporting a result of the repair.

6. The method according to claim 1, further comprising:
enumerating the connection relationships among the plurality of chips according to a determined number of the plurality of chips; and
configuring the plurality of chips according to a user-specified connection relationship among the enumerated connection relationships.

7. The method according to claim 1, wherein the host is a central processing unit (CPU) and the plurality of chips are systems on chip (SoCs).

8. An apparatus for supporting communication among a plurality of chips, comprising:
at least one processor; and
a memory storing instructions, wherein the instructions when executed by the at least one processor, cause the at least one processor to perform operations, the operations comprising:
determining identity information of a plurality of chips managed by a host, the plurality of chips being connected through respective inter-chip communication interfaces for inter-chip communication;
allowing one or more of the plurality of chips to acquire identity information of other chips connected to the inter-chip communication interface of the one or more chips;
acquiring the identity information of the other chips by means of a management interface of the one or more chips with regard to communicating with the host, so as to determine connection relationships among the plurality of chips;
detecting a connection fault by the inter-chip communication interface of the one or more chips;
switching, in response to the detected connection fault being irreparable, a service transmitted by the inter-chip communication interface of the one or more chips to an additional inter-chip communication interface; and
reporting the connection fault.

9. The apparatus according to claim 8, wherein the allowing one or more of the plurality of chips to acquire identity information of other chips comprises:

acquiring status information of the inter-chip communication interface of the one or more chips;

transmitting, in response to the status information being an active status, test data to the other chips, connected to the inter-chip communication interface, among the plurality of chips through the inter-chip communication interface of the one or more chips; and receiving response data of the test data, the response data comprising the identity information of the other chips.

10. The apparatus according to claim 9, wherein the transmitting the test data to the other chips comprises:

configuring a predetermined address range for the inter-chip communication interface of the one or more chips; and transmitting test data to an address of the other chips within the predetermined address range.

11. The apparatus according to claim 8, wherein the operations further comprise:

storing the determined connection relationships among the plurality of chips in a connection matrix, wherein the connection matrix comprises at least one of followings:

status information of the respective inter-chip communication interfaces of the plurality of chips, and bandwidth information.

12. The apparatus according to claim 8, wherein the operations further comprise:

repairing the connection fault in response to the detected connection fault being repairable; and reporting a result of the repair.

13. The apparatus according to claim 8, wherein the operations comprise:

enumerating the connection relationships among the plurality of chips according to a determined number of the plurality of chips; and configuring the plurality of chips according to a user-specified connection relationship among the enumerated connection relationships.

14. The apparatus according to claim 8, wherein the host is a central processing unit (CPU) and the plurality of chips are systems on chip (SoCs).

15. A non-transitory computer readable storage medium, storing a computer program, wherein the program, when executed by a processor, causes the processor to perform operations, the operations comprising:

determining identity information of a plurality of chips managed by a host, the plurality of chips being connected through respective communication interfaces for inter-chip communication;

allowing one or more of the plurality of chips to acquire identity information of other chips connected to the inter-chip communication interface of the one or more chips;

acquiring the identity information of the other chips through a management interface of the one or more chips with regard to communicating with the host, so as to determine connection relationships among the plurality of chips;

detecting a connection fault by the inter-chip communication interface of the one or more chips;

switching, in response to the detected connection fault being irreparable, a service transmitted by the inter-chip communication interface of the one or more chips to an additional inter-chip communication interface; and reporting the connection fault.

\* \* \* \* \*